Dec. 9, 1924. 1,518,774
A. I. CONRAD
AGRICULTURAL IMPLEMENT
Filed Jan. 3, 1921
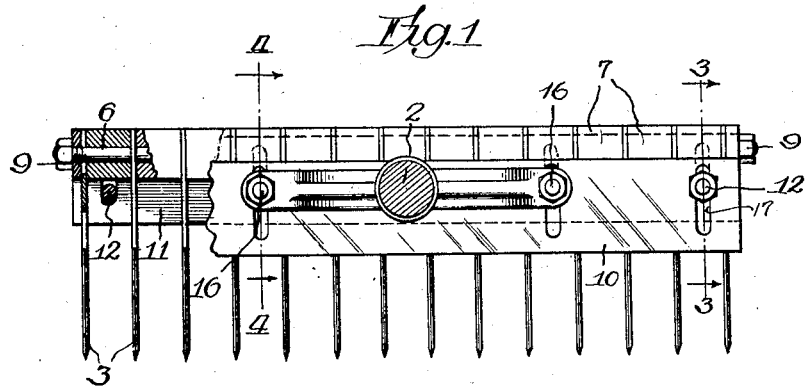
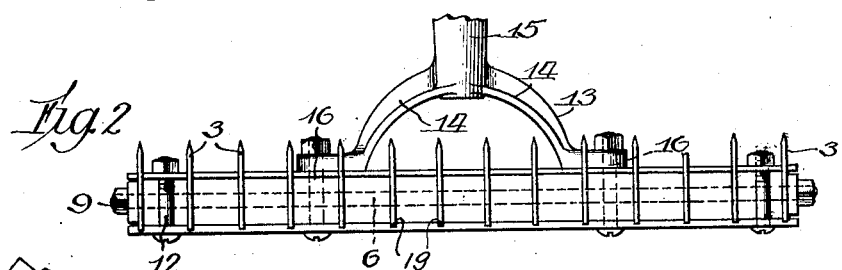
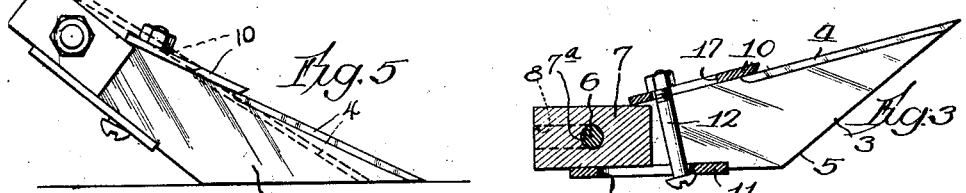
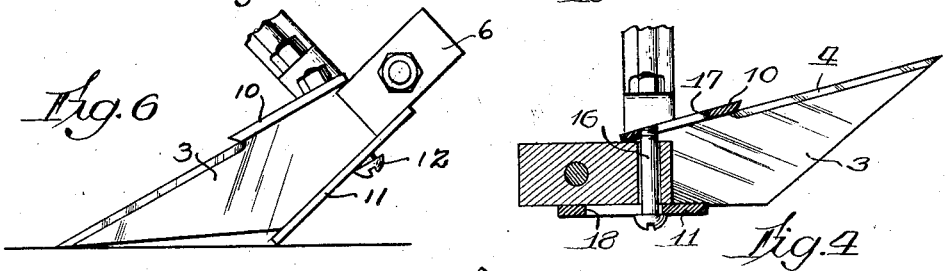
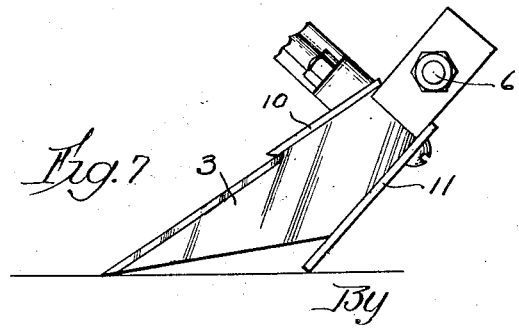
Inventor:
Albert I. Conrad.

Patented Dec. 9, 1924.

1,518,774

UNITED STATES PATENT OFFICE.

ALBERT I. CONRAD, OF PASADENA, CALIFORNIA.

AGRICULTURAL IMPLEMENT.

Application filed January 3, 1921. Serial No. 434,694.

*To all whom it may concern:*

Be it known that I, ALBERT I. CONRAD, a citizen of the United States, and a resident of Pasadena, in the county of Los Angeles and State of California, have invented certain new and useful Improvements in Agricultural Implements, of which the following is a specification.

This invention relates to improvements in rakes and like agricultural implements, utilized for cultivating purposes, and especially for the care of grassed areas, and in the removal of tenacious weed growths which flourish in certain sections of the country.

A rake embodying the invention is of that general type disclosed in Letters Patent Number 1,339,436, granted to me on the 11th day of May, 1920, and in an application filed by me in the United States Patent Office on the 11th day of October, 1920, and bearing Serial Number 416,299.

The purpose of the present invention is to provide certain improvements in the structural features of the device pertaining more especially to the adjustability of the parts whereby the action of the implement may be altered to meet different conditions of use, or to obtain different results by its use. A further object is to provide improvements in construction calculated to increase strength of the parts and to compensate for the wear, thereby materially increasing the life and efficiency of the implement.

An implement embodying the improved features embodying the invention is fully illustrated in the accompanying drawings, in which—

Fig. 1 is a view in front elevation of the head of the implement,

Fig. 2 is a bottom plan view of the head.

Fig. 3 is an enlarged cross-sectional view taken on line 3—3 of Fig. 1.

Fig. 4 is a similar view taken on line 4—4 of Fig. 1.

Fig. 5 is a view in elevation, showing the manner in which the cutter bar is adjusted to compensate for the wear of the blades, and Figs. 6 and 7 are views in end elevation, showing the manner in which the action of the rake is changed by adjusting the reinforcing bar.

A preferred embodiment of the invention comprises in general a rake head or implement 1, secured to the end of a handle 2, the arrangement of the parts being similar to the ordinary type of garden rake. The manipulation of the rake is likewise similar to the ordinary type, the distinction residing in the details or structure of the rake head and the results secured in drawing the same through the weed infected turf or lawn.

Generally speaking, the head or implement 1 consists of an assembly of series of detached units or parts which are joined together to form the complete structure. The essential units are perhaps the tines or blades 3 resembling a series of knife-blades, each having a sharpened portion 4 along its forward edge, extending from a point substantially midway between its ends to the lower extremity which terminates in a sharp point. The back edge of each blade is beveled as at 5, the beveled portion having substantially the same extent as the sharpened edge 4. These blades are arranged in spaced relation and in uniform disposition throughout the length of the head in the following manner:

A cylindric rod 6 extends throughout the length of the head, upon which are mounted a series of spacer blocks 7, the same being preferably of metal and of uniform rectangular shape, each block being provided with a transverse bore 7ª through which the rod 6 extends.

The upper ends of the blades 3 are inserted between the spacer blocks and engage the rod by means of U-shaped slots 8, extending longitudinally from the upper edge of the blades. The ends of the rods are threaded and nuts 9—9 mounted thereon, it being obvious that by tightening one or both of the nuts, the blocks and blades will be frictionally held together in the form of a rigid bar from which the sharpened blades project.

Extending longitudinally of the rake head and bearing against the front faces of the blocks 7, and forward edges of the blades 3, is a cutter bar or blade 10 provided with a sharpened lower edge, terminating just beyond or slightly overlapping the upper ends of the sharpened edges. At the back of the rake head and likewise extending the length thereof, is a bar or plate 11 serving to strengthen the structure and to maintain the blocks and blades in uniform alignment. This bar differs from the cutter bar 10 in that it has not a sharpened edge and serves only as a reinforcing member of the rake head. The cutter bar 10 and plate 11 are connected to the rake head, and with each other, by means of bolts 12—12 passing through the ends of the same, and through holes formed in the endmost spacer blocks 7.

Intermediate the ends of the rake head and extending substantially at right angles to the front face thereof, is a handle yoke 13 comprising diverging arms 14—14 bearing flatwise at their ends against the cutter bar 10, and a ferrule 15 in which the end of the handle 2 is inserted. The yoke 13 is connected to the rake head by means of bolts 16—16 extending through the cutter bar 10, the adjacent spacer blocks 7—7 and the plate 11 in the same manner as bolts 12—12.

Referring now in detail to the cutter bar 10 and plate or reinforcing bar 11, these members are secured as already suggested, to the assembled units of the rake head by means of the bolts 12 and 16, extending transversely through the parts, there being provided in the cutter bar transversely elongated slots 17—17 registering with the holes through the spacer blocks, and serving to secure the bolts 12 and 16. Similarly, the plate 11 is provided with elongated slots 18 extending transversely thereof, and positioned to register with the bolt holes as before.

As clearly shown in Figs. 3 and 4, the cutter bar 10 is normally positioned so that its cutting edge extends along the line of the sharpened edges 4, of the blades 3, the elongated slots 17 being so located as to limit the downward movement of the cutter bar in its normal position, but will permit the backward adjustment of said cutter bar for the purpose hereinafter to be set forth.

The plate 11 secured to the back of the head 1, is likewise adjustable transversely by reason of the slots 18, and normally occupies the position shown in Figs. 2 and 4, with its lower edge spaced away from the beveled back edges 5 of the blades 3. Furthermore, there are formed on the inner face of the plate 11, a series of parallel slots 19, the spacing of these slots corresponding to the spacing of the blades 3. These slots vary in depth and gradually become shallower toward the upper edge of the plate, as is shown in Figs. 3 and 4. These slots 19—19 engage the edges of the blades and serve to strengthen and reinforce the same in that greater stiffness is afforded, thus eliminating a certain degree of flexibility, and the attendant danger of their being snapped off at their bases.

It is now manifest that the cutter bar 10 and plate 11 are both adjustable transversely, the former being adjustable rearwardly from its normal position, and the latter forwardly (or downwardly) from its normal position. The purpose of the adjustable cutting bar will first be discussed. Assuming that in a new rake the parts occupy the relative positions shown in full lines in Fig. 5, it is natural that after considerable use the points of the blades become worn and dulled, necessitating periodic sharpening or grinding of the cutting edges 4. The result is a shortening of the blade, and a grinding back of the sharpened edge in order to retain the effective cutting surface. In other words, the blade in time may assume the shape shown in dotted lines, Fig. 5. In order to compensate for this wear, it is desirable to move the cutter bar from time to time in a rearward direction, thus retaining the same length of cutting edge 4, this adjustment being readily accomplished by loosening the bolts 12 and 16, and shifting the bar bodily, a movement that is permitted by reason of the elongated slots 17. With this possibility of adjustment, these blades can be used after repeated grinding, and almost indefinitely without renewal.

The adjustability of the plate 11 is accomplished in quite the same manner, although for a different purpose. As before stated, the normal position of the plate is such as shown in Figs. 3 and 4, and in this connection it is to be pointed out that the angular relation of the blades to the handle is such that the head 1, in passing over the surface of the ground, under normal conditions of manipulation, slides along the beveled back edges 5 of the blades, the points of the blades just scraping the ground without penetrating the surface. Now, referring to Fig. 6, the plate as shown is shifted downwardly so that it projects a short distance beyond the upper ends of said beveled edges 5. If the rake head is moved forwardly along the ground, the plate will cause a slight tilting forward of the head with the result that the points of the blades 5 will dig into or penetrate the surface, producing a cultivating or harrow action. Clearly, the depth of penetration may be varied by adjusting the position of the plate 11, as shown in Fig. 7. The use of an adjustable plate increases the usefulness of the rake, making it equally available for treatment of the ground preparatory to sowing of seed, as well as an implement for removal of weeds and undesired growth from lawns.

Having described the invention, I claim as my invention:

In an implement of the character described, the combination of a head comprising a plurality of cutting blades extending transversely of said head and having sharpened front edges and blunt rear edges, said blades being adapted to engage the ground, with their sharpened edges at a predetermined angle thereto, and a bar extending lengthwise of said head and engaging the back edges thereof, and means for adjusting said bar longitudinally of said blades to vary the angle of the edges of said blades with the ground level.

In witness whereof, I hereunto subscribe my name this 27th day of December, A. D., 1920.

ALBERT I. CONRAD.